United States Patent
Boulanger et al.

(10) Patent No.: US 10,509,901 B2
(45) Date of Patent: Dec. 17, 2019

(54) METHOD OF MANAGING A SECURE ELEMENT

(71) Applicant: GEMALTO SA, Meudon (FR)

(72) Inventors: Nicolas Boulanger, Gemenos (FR);
Thierry Silvestre, Gemenos (FR);
Olivier Roche, Gemenos (FR);
Pannawit Thengtrirat, Gemenos (FR);
Sylvain Charbonnier, Gemenos (FR)

(73) Assignee: THALES DIS FRANCE SA, Meudon (FR)

( * ) Notice: Subject to any disclaimer, the term of this patent is extended or adjusted under 35 U.S.C. 154(b) by 261 days.

(21) Appl. No.: 15/567,770

(22) PCT Filed: Mar. 23, 2016

(86) PCT No.: PCT/EP2016/056412
§ 371 (c)(1),
(2) Date: Oct. 19, 2017

(87) PCT Pub. No.: WO2016/169722
PCT Pub. Date: Oct. 27, 2016

(65) Prior Publication Data
US 2018/0107822 A1    Apr. 19, 2018

(30) Foreign Application Priority Data

Apr. 22, 2015  (EP) .................................. 15305607

(51) Int. Cl.
*G06F 21/51*    (2013.01)
*G06F 21/57*    (2013.01)
*G06F 9/445*    (2018.01)

(52) U.S. Cl.
CPC .............. *G06F 21/51* (2013.01); *G06F 21/57* (2013.01); *G06F 9/44521* (2013.01)

(58) Field of Classification Search
CPC .................................. G06F 21/51; G06F 21/53
(Continued)

(56) References Cited

U.S. PATENT DOCUMENTS 9,198,024 B1 * 11/2015 Khalid .................... H04W 4/80
2004/0255263 A1 * 12/2004 Ando ........................ G06F 8/60
717/100

(Continued)

FOREIGN PATENT DOCUMENTS

EP    0 688 010 A1    1/2014
FR    0 864 650 A1    7/2005
(Continued)

OTHER PUBLICATIONS

International Search Report (PCT/ISA/210) dated Jun. 9, 2016, by the European Patent Office as the International Searching Authority for International Application No. PCT/EP2016/056412.
(Continued)

*Primary Examiner* — Haresh N Patel
(74) *Attorney, Agent, or Firm* — Buchanan Ingersoll & Rooney PC

(57) ABSTRACT

The invention is a method for managing a secure element that comprises an operating system and a software application including an executable part which is tied to the operating system through a plurality of links. The method comprises the following steps: on receipt of an un-map command, recording in a memory area of the secure element a description of said links using an intermediate language, replacing the operating system by a new operating system by keeping said memory area unchanged, on receipt of a re-map command by the secure element, restoring a new set of links between the executable part and the new operating system by using the description.

10 Claims, 3 Drawing Sheets

(58) Field of Classification Search
USPC ............................................................ 726/22
See application file for complete search history.

(56) References Cited

U.S. PATENT DOCUMENTS

| | | |
|---|---|---|
| 2007/0277168 A1 | 11/2007 | Vetillard |
| 2009/0204806 A1* | 8/2009 | Kanemura ............... G06F 21/10 713/155 |
| 2010/0218197 A1* | 8/2010 | Takeuchi ............ G06F 9/45512 719/319 |
| 2011/0145586 A1* | 6/2011 | Meyn ...................... G06F 21/72 713/176 |
| 2011/0209220 A1* | 8/2011 | Tikkanen ................ G06F 9/442 726/24 |
| 2012/0060168 A1* | 3/2012 | Lee, II .................. G06F 9/4887 718/104 |
| 2012/0143929 A1* | 6/2012 | Baratakke ............. G06F 16/188 707/827 |
| 2013/0060959 A1* | 3/2013 | Taveau .................. H04W 12/08 709/232 |
| 2013/0067238 A1* | 3/2013 | Homme .................. G06F 21/51 713/189 |
| 2013/0303146 A1* | 11/2013 | Van Voorhees ......... G06F 21/53 455/418 |
| 2014/0020049 A1* | 1/2014 | Smith, III ............. G06F 21/121 726/1 |
| 2014/0025940 A1 | 1/2014 | Giraud et al. |
| 2014/0096014 A1* | 4/2014 | Johnson .................. H04L 41/22 715/733 |
| 2014/0324698 A1* | 10/2014 | Dolcino ............. G06Q 20/3227 705/44 |
| 2015/0220729 A1 | 8/2015 | Rudolph et al. |
| 2015/0350881 A1* | 12/2015 | Weiss .................... H04W 8/205 455/558 |
| 2015/0363765 A1* | 12/2015 | Alimi ................. G06Q 20/3227 705/44 |
| 2015/0371226 A1* | 12/2015 | Hurley ................... G06Q 20/40 705/64 |
| 2015/0373778 A1* | 12/2015 | Holtmanns ........... H04W 8/205 455/558 |
| 2016/0027033 A1* | 1/2016 | Lobmaier ............ G06Q 20/387 705/14.23 |
| 2016/0063480 A1* | 3/2016 | Ballesteros ........ G06Q 20/3227 705/17 |
| 2016/0063490 A1* | 3/2016 | Ziat ........................ G06Q 20/02 705/71 |
| 2016/0078397 A1* | 3/2016 | Barton ................. G06Q 20/322 705/67 |
| 2016/0095044 A1* | 3/2016 | Maria ................... H04W 48/02 370/329 |
| 2016/0117660 A1* | 4/2016 | Prakash .................. H04W 4/70 705/14.64 |
| 2016/0132875 A1* | 5/2016 | Blanco ............. G06Q 20/0453 705/44 |
| 2016/0171207 A1* | 6/2016 | Chen ......................... G06F 8/65 726/2 |
| 2016/0234013 A1* | 8/2016 | El-Marouani ......... H04W 12/02 |
| 2016/0274920 A1* | 9/2016 | Berthet ................. G06F 21/305 |
| 2016/0295344 A1* | 10/2016 | Danree ................. H04W 8/205 |
| 2016/0335433 A1* | 11/2016 | Dabosville ............ G06F 21/552 |
| 2016/0344710 A1* | 11/2016 | Khan ..................... H04L 63/061 |
| 2016/0375733 A1* | 12/2016 | Lesesky ........... G06K 19/07758 340/442 |
| 2017/0055101 A1* | 2/2017 | Studerus ................. H04W 4/50 |
| 2017/0109546 A1* | 4/2017 | Nerot ...................... G06F 21/51 |
| 2018/0225717 A1* | 8/2018 | Storti ................. G06Q 20/3272 |

FOREIGN PATENT DOCUMENTS

| | | |
|---|---|---|
| WO | WO 2008/123827 A1 | 10/2008 |
| WO | WO 2014/023394 A1 | 2/2014 |

OTHER PUBLICATIONS

Written Opinion (PCT/ISA/237) dated Jun. 9, 2016, by the European Patent Office as the International Searching Authority for International Application No. PCT/EP2016/056412.

* cited by examiner

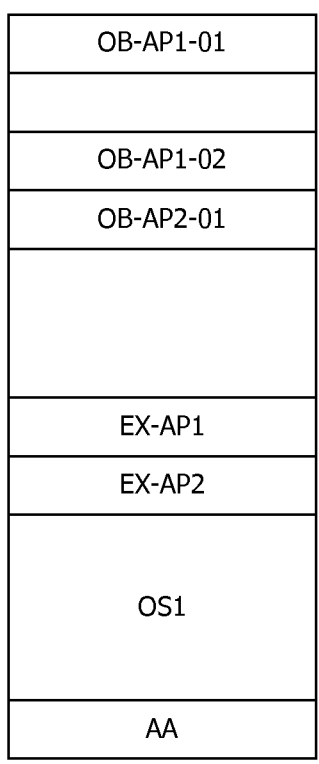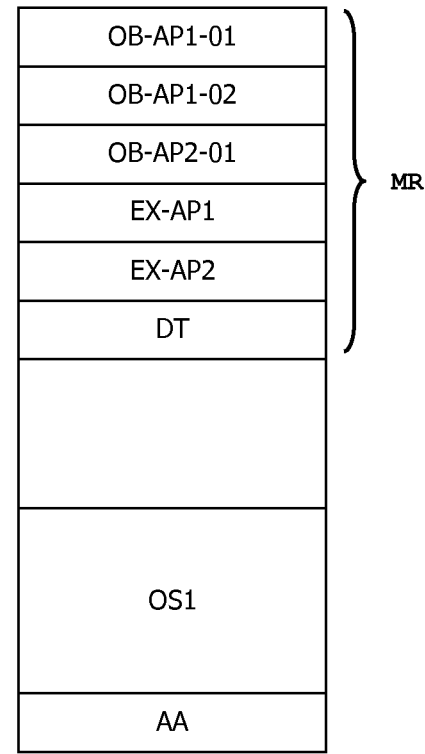
FIG. 2
FIG. 3

METHOD OF MANAGING A SECURE ELEMENT

FIELD OF THE INVENTION

The present invention relates to methods of managing a secure element. It relates particularly to methods of handling software applications installed in a secure element when a change of operating system occurs.

BACKGROUND OF THE INVENTION

A secure element is either a tamper-resistant physical component able to store data and to provide services in a secure manner or a software component emulating such a component and providing a trusted storage area and trusted services. A secure element has an operating system configured to deny access to its resources to an entity which is not entitled. In general, a secure element has a limited amount of memory, a processor with limited capabilities and is devoid of battery. For instance a UICC (Universal Integrated Circuit Card) is a secure element which embeds SIM applications for telecommunication purposes. A secure element can be installed, fixedly or not, in a terminal, like a mobile phone for example. In some cases, the terminals are constituted by machines that communicate with other machines for M2M (Machine to Machine) applications.

A secure element can be in the format of a smart card, or may be in any other format such as for example but not limited to a packaged chip as described in PCT/SE2008/050380, or any other format.

It is known to solder or weld the secure element in a host device, in order to get it dependent of this host device. This is done in M2M (Machine to Machine) applications. The same objective is reached when a chip (a secure element) containing an application is contained in the host device. The chip is for example soldered to the mother-board of the host device or machine and constitutes an embedded-secure element (eSE).

A removable secure element uniquely associated with its hosting device may also be considered as an embedded-secure element.

Applications may be downloaded and installed in a secure element. Usually, an application is linked to the operating system. For instance, the executable part of an application may call specific functions of the operating system. Due to the increasing lifetime of secure elements, the need to change the current operating system may occur after a large number of applications has been installed in the secure element. In this case, the user of the secure element may want to keep these applications even in case of replacement of the operating system by a new one. Unfortunately, the links between the applications and the replaced operating system will be lost when the replacement happens.

There is a need to maintain applications in a functional state after replacing the operating system of a secure element.

SUMMARY OF THE INVENTION

An object of the invention is to solve the above mentioned technical problem.

The object of the present invention is a method for managing a secure element comprising a first operating system and a software application including an executable part. The executable part is tied to said first operating system through a plurality of links. The method comprises the steps:

on receipt of an un-map command, recording in a memory area of the secure element a description of said links using an intermediate language, replacing the first operating system by a second operating system by keeping said memory area unchanged, on receipt of a re-map command by the secure element, restoring a new set of links between said executable part and said second operating system by using the description.

Advantageously, the description may comprise, for each links of said plurality of links, a couple made of an identifier of a calling point in said executable part and its linked called item.

Advantageously, the secure element may check the validity of credentials associated with the un-map command and deny execution of the un-map command in case of unsuccessful checking.

Advantageously, the software application may include at least one object linked to the executable part, on receipt of the un-map command, the executable part may be moved to the memory area and the link between said at least one object and the executable part may be updated.

Advantageously, the un-map command may specify an identifier of the applications to be un-mapped.

Advantageously, the secure element may include a list comprising an identifier of the applications to be un-mapped and the list may be either updated in the secure element each time a new application is installed in the secure element or updated in the secure element by an external entity.

Another object of the invention is a secure element comprising a first operating system and a software application including an executable part. The executable part is tied to the first operating system through a plurality of links. The secure element comprises:

a translating agent configured to record in a memory area of the secure element a description of said links using an intermediate language on receipt of an un-map command, an admin agent configured to replace the first operating system by a second operating system by keeping said memory area unchanged, a mapping agent configured to restore a new set of links between said executable part and said second operating system by using the description on receipt of a re-map command.

Advantageously, the description may comprise, for each link of said plurality of links, a couple made of an identifier of a calling point in said executable part and its linked called item.

Advantageously, the secure element may include a list comprising an identifier of the applications to be un-mapped.

Advantageously, the secure element may include a black list comprising an identifier of the applications which are not authorized to be un-mapped and the translating agent may be configured to ignore the applications belonging to the black list.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which:

FIG. 2 is an example of the memory of a secure element before execution of the un-map command according to the invention, FIG. 3 is an example of the memory of a secure element after execution of the un-map command according to the invention.

DETAILED DESCRIPTION OF THE PREFERRED EMBODIMENTS

The invention may apply to any types of secure element intended to store software applications. The secure element may be coupled to any type of host machine able to establish a communication session with the secure element. For example, the secure element may be embedded in a the host machine like a mobile phone, a tablet PC, an electronic pair of glasses, an electronic watch, an electronic bracelet, a vehicle, a meter, a slot machine, a TV, a gaming device or a computer.

Figure 1:
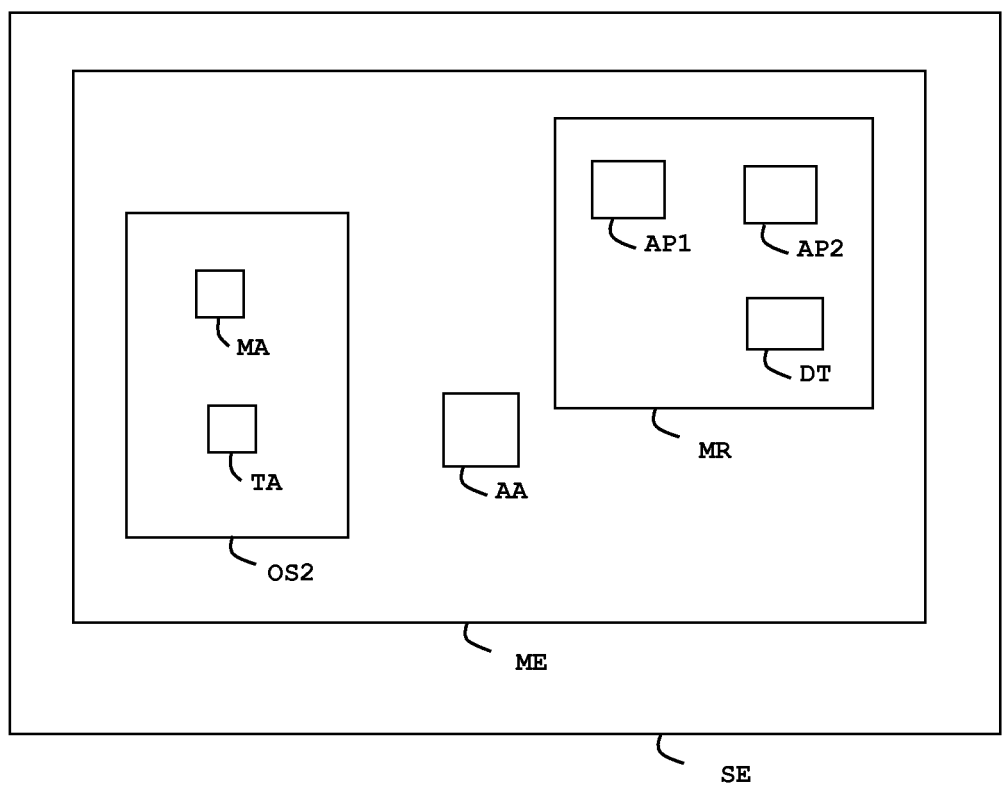
FIG. 1 is an example of a secure element according to the invention.

FIG. 1 shows an example of architecture of a secure element SE according to the invention.

In this example, the secure element SE is an embedded UICC (eUICC) which comprises a working memory of RAM type, a processing means, a non-volatile memory ME and a communication interface for exchanging data with a host device.

Figure 4:
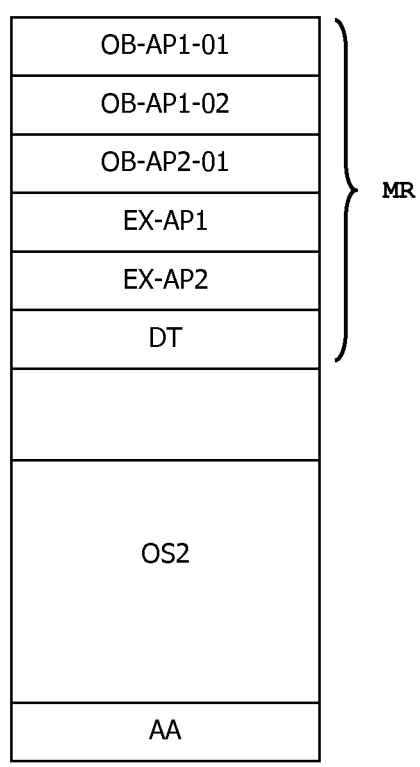
FIG. 4 is an example of the memory of a secure element after the replacement of the operating system, according to the invention.

The secure element is shown after the replacement of the operating system, in a state in connection with FIG. 4.

The non-volatile memory ME comprises a memory area MR, an admin agent AA and an operating system OS2.

The memory area MR comprises two applications AP1 and AP2 and a link description DT. These applications may be Javacard applets and the operating system OS2 may comprise a Javacard® virtual machine. Typically, each application comprise an executable part and one or several objects. For example, the application AP1 may comprise an executable part EX-AP1 and two objects OB-AP1-01 and OB-AP1-02. These objects may comprise data personalized for the user of the secure element, and sensitive data like secret keys or certificates for instance.

The admin agent AA is configured to replace the current operating system by a new operating system while keeping the memory area MR unchanged.

Advantageously the location of the memory area MR may be predefined in the admin agent AA. Alternatively, the current operating system may comprise a mechanism allowing to specifies the boundaries/constraints of the memory area MR and then post this information to the admin agent AA (through a shared memory for instance). With these constraint information, the admin agent AA is able to forbid any memory area MR update tentative. For instance, such a watchdog mechanism can be implemented using the MMU (Memory Management Unit) of the chip.

The operating system OS2 comprises a translating agent TA which is adapted to record in the memory area MR a description of the links between an application and an operating system using an intermediate language. More precisely, the translating agent TA is adapted to record a description of the links between the executable part of an application and the current operating system. This description is recorded in the link description DT. The translating agent TA is configured to run on receipt of the un-map command.

Advantageously, the link description DT may comprise, for each link, a couple made of an identifier of a calling point in the executable part of the application and its corresponding linked called item.

For instance, for the call of the "arrayCompare" method by the application, the identifier of the calling point may be described as an offset from the memory area MR or as a memory address and the linked called item of the operating system may be described using the name of the called item: "AID=Javacard.framework+Method="arrayCompare", for instance, or using a hash of the combination package+method.

In case the previous and new operating systems are similar enough, the linked called item may be described using an index, like "AID=Javacard.framework+3", meaning that the third method of the package Javacard.framework must be linked (assuming that the third method if the "arrayCompare" method).

The link from the application to the operating system could be directly replaced into the application itself by a link from the application to the link description DT that could store the description of the called item.

A link may relate to an executable Code like exemplified above. Thus, the link may be a Call reflecting the fact that the application invokes a method located into the operating system. A link may also relate to a non-executable data. In this case, the application access (read/write) some data located into the operating system. For example, in Java, an application can access some 'static field' data of the operating system. For instance, in the operating system class java.javacardx.biometry.BioBuilder, an application can access the static field 'FINGERPRINT'.

Advantageously, the translating agent TA may be configured to check the validity of credentials associated with the un-map command and to deny execution of the un-map command in case of unsuccessful checking. For instance, a secret code (like a PIN code) may be passed as input parameter of the un-map command. In another example, the translating agent TA may be adapted to check that the relevant credentials have been previously granted in the secure element SE. (for instance an Administration code have been successfully presented).

In one example, the un-map command specifies a set of applications to be un-mapped. For instance, the un-map command may convey the identifier of the targeted applications.

In another example, the secure element SE stores a list comprising an identifier of all the applications to be un-mapped and the translating agent TA is configured to record a description of the links for all applications of this list.

The secure element SE may be adapted to automatically update the list each time an application is installed or removed. Alternatively, the list may be updated by an external entity like a remote administration server.

Advantageously, the secure element SE may store a black list comprising an identifier of the applications which are not authorized to be un-mapped and the translating agent TA may be configured to ignore the applications belonging to the black list when updating the link description DT.

Anyway, the applications for which the translating agent TA does not record the links in the link description DT will become unavailable after the installation of the new operating system.

The translating agent TA may be configured to move the executable part of the applications in the memory area MR.

The translating agent TA may be also configured to move the objects of the applications in the memory area MR. These objects are linked to the executable part of the application. Preferably, the secure element SE is configured to automatically update the links between the executable part and the objects of each moved application.

Although the operating system OS2 of FIG. 1 comprises a translating agent TA, the operating system OS2 can be devoid of such a translating agent TA. In this case the operating system OS2 cannot be replaced using the invention. In this case, the translating agent TA must be included in the operating system OS1 which is replaced by the operating system OS2.

The operating system OS2 comprises a mapping agent MA adapted to restore a new set of links between the executable part of an application and the current operating system based on the link description DT on receipt of a re-map command.

The mapping agent MA is configured to analyze the link description DT and to create new links toward the new operating system.

For example, the mapping agent MA may get the list of applications to re-map by parsing the memory area MR and discovering these applications or by reading a preset field which contains the list of applications in the memory area MR. The location of the memory area MR may be pre-defined in the mapping agent MA. Alternatively, the mapping agent MA may be adapted to get the location (and size) of the memory area MR by reading at a preset address in the memory ME or through a shared memory.

It is to be noted that the translating agent TA and the mapping agent MA may be implemented as independent software components or as a single software component.

FIG. 2 shows an example of the memory ME of the secure element SE before execution of the un-map command according to the invention.

The memory ME contains, from bottom to top, the admin agent AA, the operating system OS1, the executable part EX-AP2 of the application AP2, the executable part EX-AP1 of the application AP1, a free area, an object OB-AP2-01 of the application AP2, an object OB-AP1-02 of the application AP1, another free area and an object OB-AP1-01 of the application AP1.

FIG. 3 shows an example of the memory ME of the secure element SE after execution of the un-map command according to the invention.

In this example, the applications AP1 and AP2 have been treated by the translating agent TA and their components (executable parts & objects) have been moved in the memory area MR so as to form a compact structure. The translating agent TA has created the link description DT in the memory area MR.

The admin agent AA and the operating system OS1 are kept unchanged.

At this stage, the applications AP1 and AP2 are still functional. They can be selected and executed in the framework of the operating system OS1.

Advantageously, the translating agent TA may delete the links between the applications and the current operating system. In this case, the applications AP1 and AP2 are disabled because their links with the current operating system have been removed. They cannot be selected and thus cannot be executed even if the operating system OS1 is still active.

FIG. 4 shows an example of the memory ME of the secure element SE after the replacement of the previous operating system, according to the invention.

The admin agent AA and the content of the memory area MR are kept unchanged.

The operating system OS1 has been replaced with the operating system OS2 by the admin agent AA. It is to be noted that the memory sizes required by these operating systems may be different.

It is to be noted that the admin agent AA does not modify the memory area MR when installing the new operating system.

Figure 5:
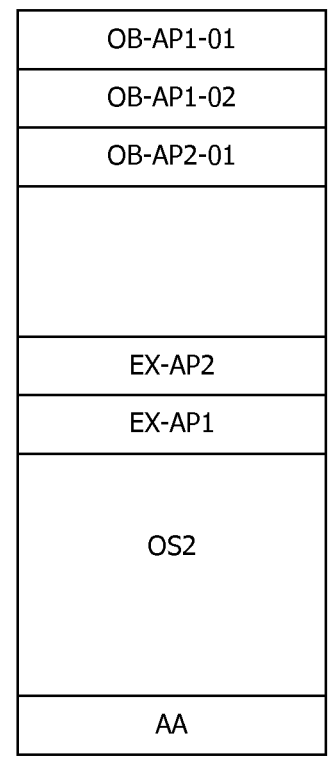
FIG. 5 is an example of the memory of a secure element after execution of the re-map command according to the invention.

FIG. 5 shows an example of the memory ME of the secure element SE after execution of the re-map command according to the invention.

The admin agent AA, the operating system OS2 and the application objects are kept unchanged.

The link description DT has been deleted for saving memory space.

The executable parts of applications have been moved near the operating system OS2. This moving allows to place the memory ME is a state similar to the initial state where the main free area is placed between the executable parts and the objects of applications. Alternatively, the executable parts of the applications may remain stored in the memory area MR.

At this stage, the applications AP1 and AP2 are fully functional again. They can be selected and run.

Thanks to the invention, the applications have been safely managed into the secure element by keeping them onboard. There is no need to temporary store these applications outside the secure element.

An advantage of the invention is to manage legacy applications without requiring any new specific design for the applications.

It must be understood, within the scope of the invention that the above-described embodiments are provided as non-limitative examples. In particular, the secure element may comprise any number of applications and the link description may be may be implemented using any appropriate coding rules or conventions.

The architecture of the secure element SE shown at FIG. 1 is provided as example only.

The invention is not limited to operating systems having a Javacard© virtual machine and may apply to any kind of operating systems.

The secure element SE is not necessarily a eUICC and can be, for example, a smart card, a removable/welded hardware component, an embedded secure element or, a USB token or a microSD© token.

The invention claimed is:

1. A method for managing a secure element comprising a first operating system and a software application including an executable part, said executable part being tied to said first operating system through a plurality of links, wherein each link of said plurality of links is an access from the executable part to data located in said first operating system wherein said method comprises:
   on receipt of an un-map command, recording in a memory area of the secure element a description of said links using an intermediate language,
   replacing the first operating system by a second operating system by keeping said memory area unchanged,
   on receipt of a re-map command by the secure element, restoring a new set of links between said executable part and said second operating system by updating the executable part using the description.

2. A method according to claim 1, wherein the description comprises, for each link of said plurality of links, a couple made of an identifier of a calling point in said executable part and its linked called item.

3. A method according to claim 1, wherein the secure element checks the validity of credentials associated with the un-map command and denies execution of the un-map command in case of unsuccessful checking.

4. A method according to claim 1, wherein the software application includes at least one object linked to the executable part and wherein on receipt of the un-map command, the executable part is moved to the memory area and the link between said at least one object and said executable part is updated.

5. A method according to claim 1, wherein the un-map command specifies an identifier of the applications to be un-mapped.

6. A method according to claim 1, wherein the secure element includes a list comprising an identifier of the applications to be un-mapped and wherein the list is either updated in the secure element each time a new application is installed in the secure element or updated in the secure element by an external entity.

7. A secure element comprising a first operating system and a software application including an executable part, said executable part being tied to said first operating system through a plurality of links, wherein each link of said plurality of links is an access from the executable part to data located in said first operating system and said secure element comprises:
- a translating agent configured to record in a memory area of the secure element a description of said links using an intermediate language on receipt of an un-map command,
- an admin agent configured to replace the first operating system by a second operating system by keeping said memory area unchanged,
- a mapping agent configured to restore a new set of links between said executable part and said second operating system by updating the executable part using the description on receipt of a re-map command.

8. A secure element according to claim 7, wherein the description comprises, for each links of said plurality of links, a couple made of an identifier of a calling point in said executable part and its linked called item.

9. A secure element according to claim 7, wherein the secure element includes a list comprising an identifier of the applications to be un-mapped.

10. A secure element according to claim 7, wherein the secure element includes a black list comprising an identifier of the applications which are not authorized to be un-mapped and wherein the translating agent is adapted to ignore the applications belonging to the black list.

* * * * *